United States Patent [19]

Yakubo et al.

[11] Patent Number: 5,084,729
[45] Date of Patent: Jan. 28, 1992

[54] SLIT SCANNING EXPOSURE APPARATUS

[75] Inventors: Minoru Yakubo, Kawaguchi; Ryoichi Kato, Yokohama, both of Japan

[73] Assignee: Fuji Photo Film Co., Ltd., Kanagawa, Japan

[21] Appl. No.: 482,098

[22] Filed: Feb. 20, 1990

[30] Foreign Application Priority Data

Feb. 20, 1989 [JP] Japan .................................. 1-40005
Mar. 20, 1989 [JP] Japan .................................. 1-69066

[51] Int. Cl.⁵ .................................................. G03B 27/58
[52] U.S. Cl. ................................. 355/74; 355/50; 355/71; 355/234
[58] Field of Search ............... 355/50, 74, 51, 71, 355/234

[56] References Cited

U.S. PATENT DOCUMENTS 3,689,149  9/1972  Livingood ............... 355/74
4,571,062  2/1986  Yoshioka et al. ......... 355/71
4,629,308  12/1986  Landa et al. ............ 355/71

Primary Examiner—Monroe H. Hayes
Attorney, Agent, or Firm—Sughrue, Mion, Zinn, Macpeak & Seas

[57] ABSTRACT

The improved slit scanning exposure apparatus has a variable slit assembly that is provided in proximity with the exposing zone and which is composed of two slit plates movable independently of each other in synchronism with the scannning speed. The apparatus may additionally have a color filter that can be inserted into the optical path of reflected light from the image on a document in the scanning direction. The apparatus is capable of preventing flare from being admitted through an exposure slit to a light-sensitive material on the exposure position when it is being exposed from light reflected from the document image. In addition, the apparatus enables more than one document image to be edited into a single image and permits the color filter to be inserted into the optical path of reflected light without causing unevenness in colors.

5 Claims, 13 Drawing Sheets

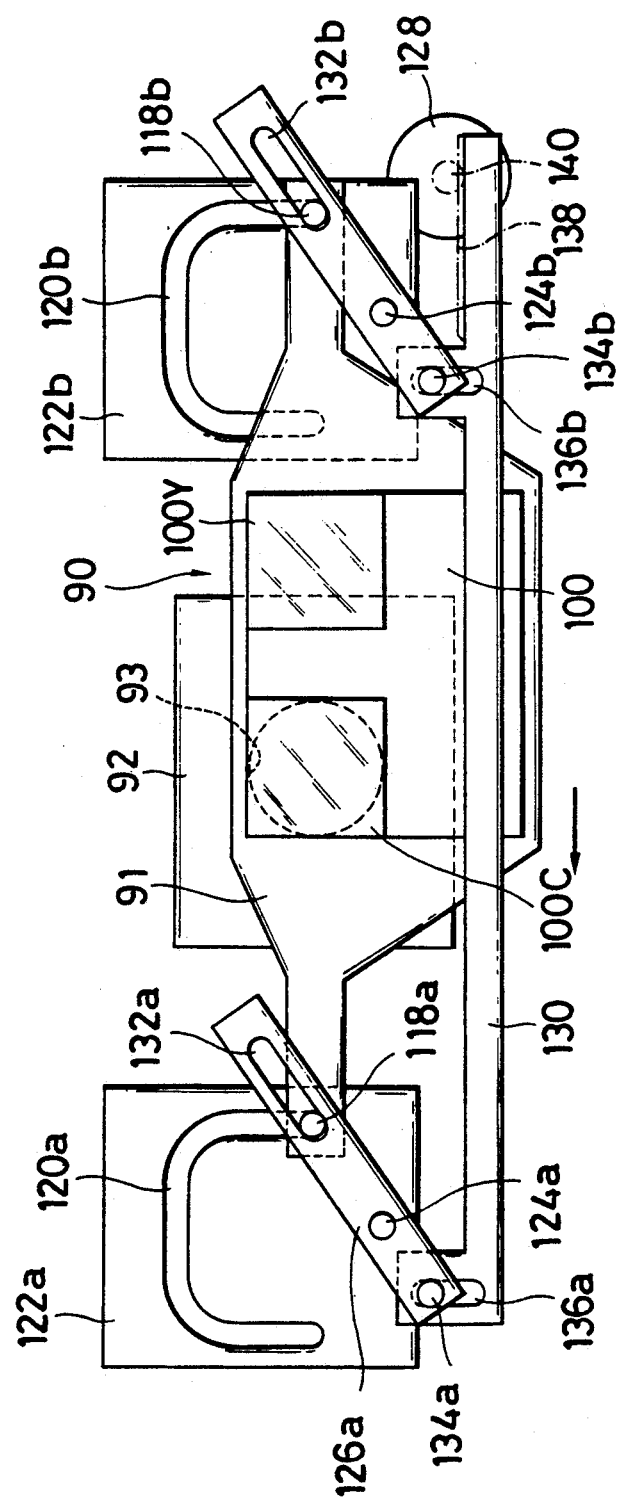

SLIT SCANNING EXPOSURE APPARATUS

BACKGROUND OF THE INVENTION

The present invention relates to a slit scanning exposure apparatus suitable for use with various types of copiers, printers, presses, etc More specifically, the present invention relates to a slit scanning exposure apparatus that is capable of effective light adjustment, in particular, the adjustment of the quality of light by means of color filters, with satisfactory color and density reproduction. The present invention further relates to a slit scanning exposure apparatus that is capable of preventing entrance of flare at the exposure position and by which editing of more than one document image is possible as required.

Exposure apparatus for use with various types of copiers, printers, presses, etc. commonly employ slit scanning exposure for several advantages it has over one-shot exposure of still image such as, for example, (1) the smallness of an area to be exposed and hence the size of the exposure apparatus, and (2) the need to use a smaller quantity of light from a light source.

An example of the application of a slit scanning exposure apparatus to a copier is shown in FIG. 9. A prior art slit scanning exposure apparatus comprises basically an exposing light source 506 which illuminates a document 504 on a platen 502 as it scans across the underside of the document in the direction indicated by arrow x, a mirror 508 that moves together with the light source 506, mirrors 510 and 512 that move in the same direction as the light source 506 at one half the speed of its movement, a lens unit 514 composed of such elements as imaging lenses, color filters and various types of diaphragm stop, photometric means 516 for performing photometry on reflected light from the document 504 during prescanning or adjustment for white balance, etc., and a shutter 520 which changes the direction of the optical path L in such a way that light is admitted either into the photometric means 516 or onto an exposure plane 518.

In the slit scanning exposure apparatus 500, the document 504 is illuminated with the exposing light source 506 which performs scanning at a predetermined speed in the direction indicated by arrow x. Light reflected from the document 504 (which light is hereinafter referred to as "reflected light") passes through a slit 507 and is reflected, in sequence, by mirror 508 that moves together with the light source 506 and mirrors 510 and 512 that move in the same direction as the light source 506 at one half the speed of its movement The so reflected light travels over the optical path L and is admitted into the lens unit 514 where it is so adjusted as to be focused in a predetermined exposure position, namely, exposure plane 518 and further adjusted for the quantity and quality of light before it passes through an exposure slit 522 and is focused in the exposure plane 518 so as to scan and expose a light-sensitive material 528 which is being transported by means of two roller pairs 524 and 526 in synchronism with the scan speed of the light source 506.

When the exposure is completed, the light source 506 turns off and the shutter 520 blocks the optical path L by pivoting about a fulcrum 520a to move from the position indicated by a solid line in FIG. 9 to the position indicated by a dashed line.

In the prior art slit scanning exposure apparatus, adjustment of the quality of reflected light which is necessary to adjust the color balance and color densities is accomplished by means of various color filters that are mounted in the light source unit, lens unit or some other unit and which are selectively inserted into the optical path of reflected light A lens unit having such color filters installed in its interior is shown in FIG. 10. The lens unit which is generally indicated by 514 can be used as the lens unit in the slit scanning exposure apparatus 500 shown in FIG. 9.

The lens unit 514 shown in FIG. 10 comprises the front group 532 and rear group 534 of imaging lenses, a first color filter assembly 536 having a cyan and a yellow filter, a second color filter assembly 538 having a cyan and a magenta filter, a fixed diaphragm stop 540, and a variable diaphragm stop 546 having a pair of plates 542 and 544.

The reflected light travelling in the optical path L has its quantity and quality adjusted by passage through the lens unit 514. Thereafter, the reflected light passes through an exposure slit 522 located in front of the exposure position and is focused in that position to expose a light-sensitive material 528.

To take the first color filter assembly 536 as an example, a cyan filter 550C and a yellow filter 550Y are formed on a colorless and transparent glass plate 550 by evaporation or some other suitable technique and said glass plate is then incorporated into a frame 552. A rack 554 is formed on the frame 552 which engages a motor 560 via gears 556 and 558.

When the motor 560 rotates, the frame 552 of the first color filter assembly 536 is caused to move along the length of exposure slit 522 in the direction indicated by a double-headed arrow, namely, in a direction perpendicular to the scanning direction, and this permits either one of the cyan and yellow filters to be inserted into the optical path L. Stated more specifically, cyan filter 550 C is inserted into the optical path L if the motor 560 rotates clockwise, whereas yellow filter 550Y is inserted into the optical path L if the motor 560 rotates counterclockwise, with the movement of either filter being parallel to the length or longer side of the slit 522. By controlling the amount of motor rotation, the amount in which each filter is inserted into the optical path L is varied to achieve proper adjustment of the reflected light.

The second color filter assembly 538 has the same construction as the first color filter assembly 536 in that a cyan filter 562C and a magenta filter 562M are formed on a transparent glass plate 562.

The prior art slit scanning exposure apparatus 500 shown in FIG. 9 is so constructed that when the imaging lens unit (lens unit 514) is moved along the optical path L, mirrors 510 and 512 are also moved to change the optical path length, with a consequent change in the exposing ratio to permit size reduction or enlargement of the image to be formed. The spot of reflected light focused in the exposure plane 518 has a certain width in the direction in which the light-sensitive material is scanned as indicated by arrow z. This width which is hereinafter sometimes referred to as the "scan width" varies with the specific exposing ratio selected. If the slit 507 in the light source 506 is assumed to have a width of 10 mm, the scan width is 10 mm for the exposing ratio 1:1, 20 mm for the ratio 1:2, and 5 mm for the ratio 1:0.5. Hence, the width of exposure slit 522 located in front of the exposure plane 518 is usually set to about 16–20 mm in a slit scanning exposure apparatus that has a scan width of 10 mm for an exposing ratio of 1:1 and that is capable of exposing at ratios ranging from 1:0.5 to 1:2. However, if the exposure slit 522 has a width of 16 mm, the scan width becomes smaller than said slit width when size-for-size or reduction exposure is to be performed, thereby creating a gap in the exposure slit 522 in either the upper or lower portion or both in the direction of scanning by reflected light. In the presence of such gaps, "flare" such as randomly reflected light from the imaging lens unit or extraneous light will fall on the exposure plane 518 to produce an unsatisfactory image such as an unsharp image or an image with a blurred contour.

Modern versions of slit scanning exposure apparatus are often required to perform a special type of exposure, such as exposing only a selected area of a light-sensitive material with reflected light from a small document and leaving the other areas unexposed, or exposing a light-sensitive material with only the light reflected from part of the image on a document and leaving the other part of the image unprocessed. Following these operations, the unexposed areas are exposed and by performing such multiple exposure, desired portions of more than one image are combined to form a single image. This "editing" procedure is difficult to accomplish with the prior art slit scanning exposure apparatus unless masking or other extra steps are taken.

Including the first color filter assembly 536 and the second color filter assembly 538 used in the lens unit 514 shown in FIG. 10, all of the color filters used to adjust the quality of light in the prior art slit scanning exposure apparatus are so constructed that they are inserted into the optical path in a direction perpendicular to the scanning direction, or in a direction parallel to the slit length, with the reflected light being adjusted in accordance with the amount in which a specific filter is inserted.

As a result of various studies they conducted in order to improve the prior art slit scanning exposure apparatus, the present inventors found that when color filters for adjusting the quality of light were inserted into the optical path L in a direction parallel to the slit length as in the prior art, uneven color formation occurred in the resulting image. As already mentioned, the quality of light is adjusted not only by changing the type of color filter to be inserted into the optical path L but by varying the amount in which it is inserted. Hence, the rays of light emerging from the color filter assembly will unavoidably contain the portion which has passed through the inserted color filter and the portion which has not. The light component which passed through the inserted color filter will have its quality adjusted before it falls on the exposure position to expose the light-sensitive material, whereas the component that has passed through the position where no color filter was inserted will fall, totally unadjusted, on the exposure position to expose the light-sensitive material.

In slit scanning exposure, scanning for exposure is performed along the shorter side of slit, namely, in a direction perpendicular to the direction in which color filters are to be inserted into the optical path. Thus, not all surface of the light-sensitive material can be exposed with properly adjusted light but instead two differently exposed areas will occur on a single light-sensitive material, one area being exposed with properly adjusted light and the other being exposed with yet to be adjusted light. Consequently, the image obtained will not have uniform colors across the surface of the light-sensitive material but suffers the problem of uneven color formation.

BRIEF SUMMARY OF THE INVENTION

The first object, therefore, of the present invention is to provide a slit scanning exposure apparatus that is capable of adjusting the exposure slit in front of the exposure plane in accordance with whatever exposing ratio is selected, that is capable of performing exposure in a satisfactory way by effectively safeguarding against the admission of flare toward the exposure plane, and that can be furnished, if necessary, with an editing capability such that multiple exposure is performed by combining such special procedures as exposing only a desired area of a light-sensitive material with reflected light from the image on a small document, or exposing a light-sensitive material with reflected light from the image on only a desired area of a document.

The second object of the present invention is to provide a slit scanning exposure apparatus of a type that adjusts the quality of light in accordance with the amount by which a certain color filter is inserted into the optical path and which is capable of forming an image that is free from uneven colors but which insures uniform color shades in every part of the image.

According to its first aspect, the present invention attains the above-stated objects by a slit scanning exposure apparatus comprising an exposing light source, a plurality of mirrors by which the light emitted from said exposing light source and which is reflected from the image on a document moving relative to said exposing light source is reflected toward a predetermined exposure position, an imaging lens unit that acts on the optical path of said reflected light and by which the image on said document is focused in said exposure position on a light-sensitive material that is being transported in synchronism with the speed at which the image on said document is scanned with said exposing light source, a pair of slit plates that are provided in front of said exposure position and which are movable independently of each other in the scanning direction, drive means for causing said pair of slit plates to move independently of each other, and control means for controlling said drive means in such a way that said pair of slit plates will move independently of each other in accordance with the area of said light-sensitive material to be exposed.

According to its second aspect, the present invention attains the above-stated objects by a slit scanning exposure apparatus comprising an exposing light source, a plurality of mirrors by which the light emitted from said exposing light source and which is reflected from the image on a document moving relative to said exposing light source is reflected toward a predetermined exposure position, an imaging lens unit that acts on the optical path of said reflected light and by which the image on said document is focused in said exposure position on a light-sensitive material that is being transported in synchronism with the speed at which the image on said document is scanned with said exposing light source, and at least one color filter that can be inserted into the optical path of said reflected light in the scanning direction.

According to its third aspect, the present invention attains the above-stated objects by a slit scanning exposure apparatus which in the second aspect of the present invention further includes a pair of slit plates that are provided in front of said exposure position and which are movable independently of each other in the scanning direction, drive means for causing said pair of slit plates to move independently of each other, and control means for controlling said drive means in such a way that said pair of slit plates will move independently of each other in accordance with the area of said light-sensitive material to be exposed.

In a preferred embodiment of the first and third aspect, said drive means comprises a rack formed on each of said slit plates, a gear meshing with said rack, and a motor for driving said gear.

In another preferred embodiment of the first and third aspect, said slit plates are movable in synchronism with the speed at which said light-sensitive material is transported for scanning.

In still another preferred embodiment of the first and third aspect, said exposing light source and said plurality of mirrors form an imaging optical unit of moving type which moves to perform scanning by illuminating said image on a document which is fixed.

In another preferred embodiment of the second and third aspect, said color filter is provided between two lens groups in said imaging lens unit.

In still another preferred embodiment of the second and third aspect, said color filter consists of filters of the three primary colors.

In a further preferred embodiment of the second and third aspect, said filters of the three primary colors are a cyan, a magenta and a yellow filter.

In yet another preferred embodiment of the second and third aspect, said color filter is formed on a color filter plate and is inserted into the optical path of said reflected light by a drive mechanism composed of pins formed on opposite ends of said color filter plate, support members having guide grooves of a generally U or inverted U shape which are in respective engagement with said pins, transmission members which are pivotally supported on fulcrums formed on the respective support members and which have slits or elongated holes at one end which are in engagement with said pins, a drive member for causing the other end of each of said transmission members to pivot, and drive means for said drive member.

In a further preferred embodiment of the second and third aspect, said color filter plate has two different color filters formed thereon.

In a further preferred embodiment of said two different color filters are formed on two color filter plates, with at least one of said color filters on one color filter plate being different from the color filters on the other color filter plate.

BRIEF DESCRIPTION OF THE DRAWINGS

FIG. 6a to 6c are diagrammatic front views of the first color filter assembly to be used in the lens unit shown in FIG. 5;

DETAILED DESCRIPTION OF THE INVENTION

Figure 1:
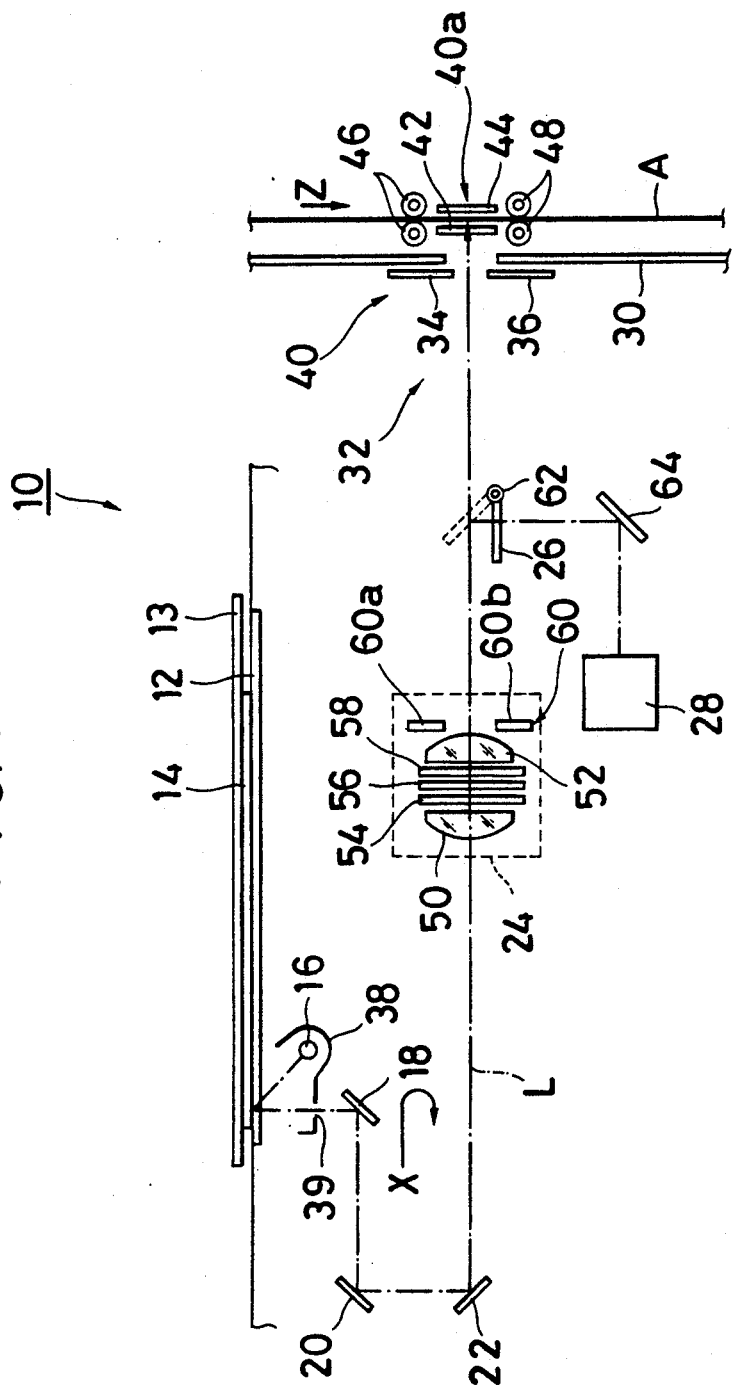
FIG. 1 is a diagrammatic sectional view of a slit scanning exposure apparatus according to an embodiment of the present invention.

The present invention is described below in greater detail.

The slit scanning exposure apparatus of the present invention is chiefly intended to be used with image recording apparatus which records image on light-sensitive materials. Light-sensitive materials with which the present invention may be employed include color or monochromatic silver halide photographic materials, and non-silver halide photographic materials such as light-sensitive drums and thermographic materials. The slit scanning exposure apparatus of the present invention may be applied to various types of image recording apparatus including, for example, color or monochromatic silver halide photographic copiers, non-silver halide photographic copiers, electrophotographic image recording apparatus, silver halide photographic image recording apparatus, thermal transfer image recording apparatus, ink-jet image recording apparatus, and those image recording apparatus which employ various other light-sensitive materials such as light- and pressure-sensitive materials and photopolymeric materials.

In using the slit scanning exposure apparatus of the present invention, the image on a document may be scanned with either the light source or the document platen being moved. In the description that follows, a slit scanning exposure apparatus that employs an optical system that performs imaging with the light source being moved is taken as a typical example.

To begin with, the first embodiment of the present invention depicted in FIGS. 1 to 3b is described below.

The slit scanning exposure apparatus according to the first embodiment of the present invention has a pair of slit plates that are located in front of the exposure plane of a light-sensitive material and that are capable of moving independently of each other. During exposure, the individual slit plates can be moved as the light-sensitive material moves in synchronism with the speed at which the image on the document is scanned with an exposing light source. The spot of reflected light from the document will vary in width in the scanning direction in accordance with the specific exposing ratio selected but in the slit scanning exposure apparatus of the present invention, the slit width can be adjusted in response to these variations in scan width, so in no case will a gap be formed between the spot of reflected light and the exposure slit. Flare such as randomly reflected light from the imaging lens unit can thus be effectively prevented from falling on the exposure plane, to thereby insure the formation of a satisfactory image irrespective of the exposing ratio selected.

Further, the slit scanning exposure apparatus of the present invention can be so constructed that when the exposure position on a light-sensitive material is designated by various means, the two slit plates are moved independently of each other to close or open the exposure slit in accordance with the designated exposure position. Hence, by combining this apparatus with region designating means such as a digitizer, a special operation, such as exposing only a selected area of the light-sensitive material with reflected light from a selected part of the image on a document or exposing only a selected area of the light-sensitive material with reflected light from the image on a small document, can be performed. These techniques can be utilized to perform multiple exposure and edit a single image from the combination of two or more documents.

The slit scanning exposure apparatus according to the first embodiment of the present invention is described below in greater detail with reference to FIGS. 1 to 3b.

FIG. 1 is a diagrammatic sectional view of the slit scanning exposure apparatus. In the slit scanning exposure apparatus (hereinafter sometimes referred to simply as a "scanning exposure apparatus") which is generally indicated by 10 in FIG. 1, a document 14 is placed on a platen 12 such as copy glass and is fixed in position by means of a top cover 13 and in association with the image on this document, a light-sensitive material A that is pressed against a glass plate 44 by means of a plate 42 in an exposing zone 40 and that is being transported for scanning purposes by means of transport rollers 46 and 48 in the direction indicated by arrow z is exposed by slit scanning in exposure position 40a.

The scanning exposure apparatus 10 outlined above consists basically of the following components: a light source unit having an exposing light source 16 and a first mirror 18; a mirror unit having a second and a third mirror 20 and 22; a lens unit 24 capable of moving back and forth along the optical path L; a shutter 26; an image sensor 28; and a slit assembly 32 located just in front of a partition wall 30. The word "front" is used herein in connection with the direction in which reflected light travels. The scanning exposure apparatus 10 is characterized in that the slit assembly 32 is a variable slit assembly composed of a pair of slit plates 34 and 36 which are capable of moving independently of each other in the scanning direction (vertically as viewed in FIG. 1).

The light source unit is moved by certain means (not shown) across the underside of the platen 12 in the scanning direction indicated by arrow x to illuminate the document 14 with the exposing light source 16. The length of the exposing light source 16 is substantially equal to the width of platen 12, which is the dimension taken in a direction perpendicular to the scanning direction. Two typical examples of the exposing light source 16 are a halogen lamp and fluorescent lamp. This light source is equipped with a reflector 38 to increase the efficiency of light condensation and the reflector is provided with a slit 39 for defining the width of reflected light from the document 14 in the scanning direction.

The light reflected from the document 14 (this light is hereinafter referred to as "reflected light") passes through the slit 39 and is reflected by the first mirror 18 to be admitted into the mirror unit. As already mentioned, the mirror unit has the second mirror 20 and the third mirror 22 and moves in the same direction as the light source unit at one half the speed of its movement in order to further reflect the reflected light to travel in a predetermined optical path L.

The lens unit 24 is the combination of imaging lenses and a device for adjusting the quantity and quality of reflected light. It comprises the front group 50 and rear group 52 of imaging lenses, a first color filter assembly 54 composed of an unfiltered area, a cyan filter and magenta filter, a fixed diaphragm stop 56, a second color filter assembly 58 composed of an unfiltered area, a cyan filter and a yellow filter, (the first color filter assembly 54, fixed diaphragm 56 and the second color filter assembly 58 are located between the front lens group 50 and the rear lens group 52), and a variable diaphragm stop that is located behind the rear lens group 52 and that is composed of a pair of plates 60a and 60b.

Figure 5:
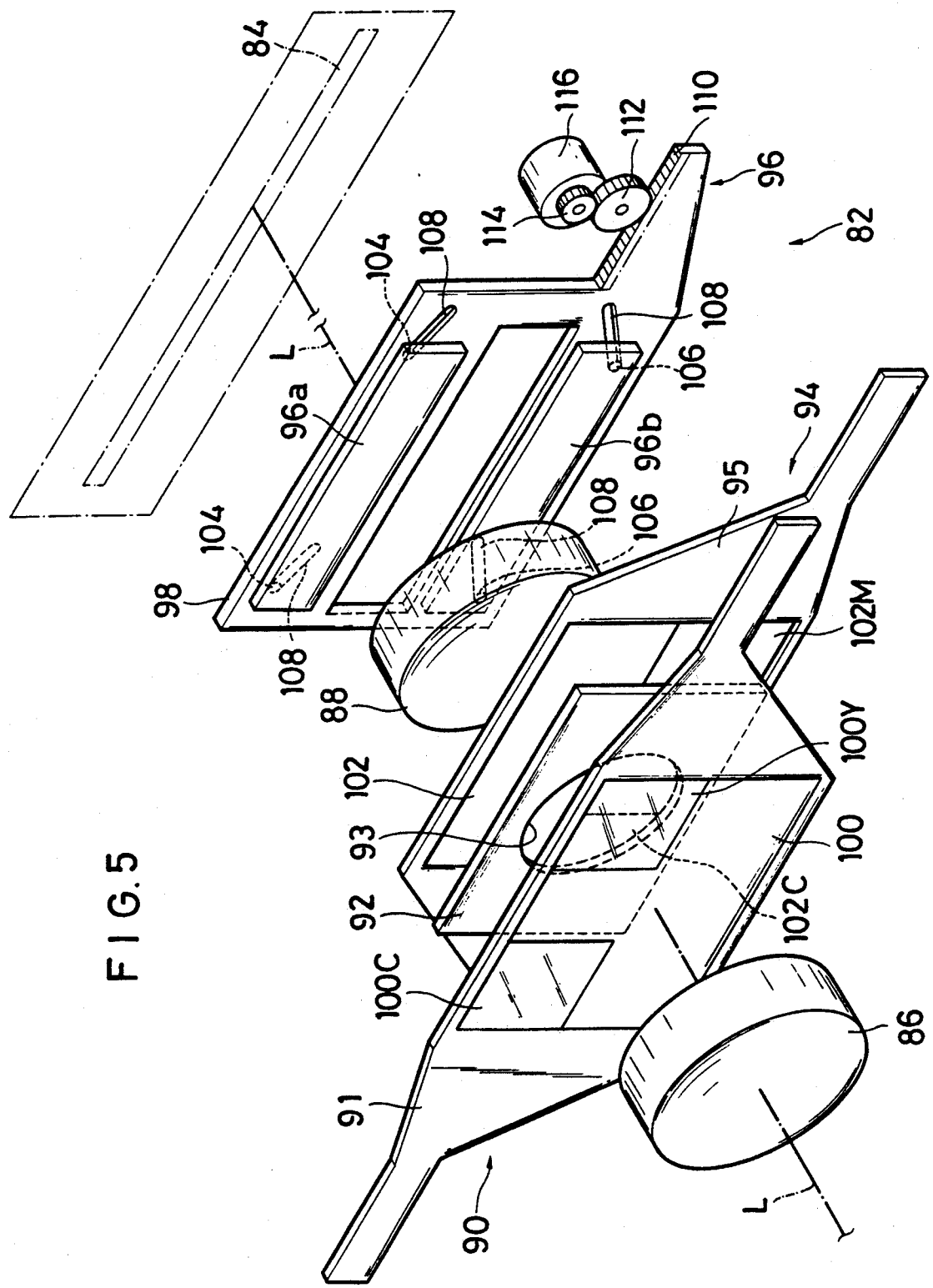
FIG. 5 is a diagrammatic perspective view of an example of the lens unit to be used in the slit scanning exposure apparatus of the present invention.
Figure 10:
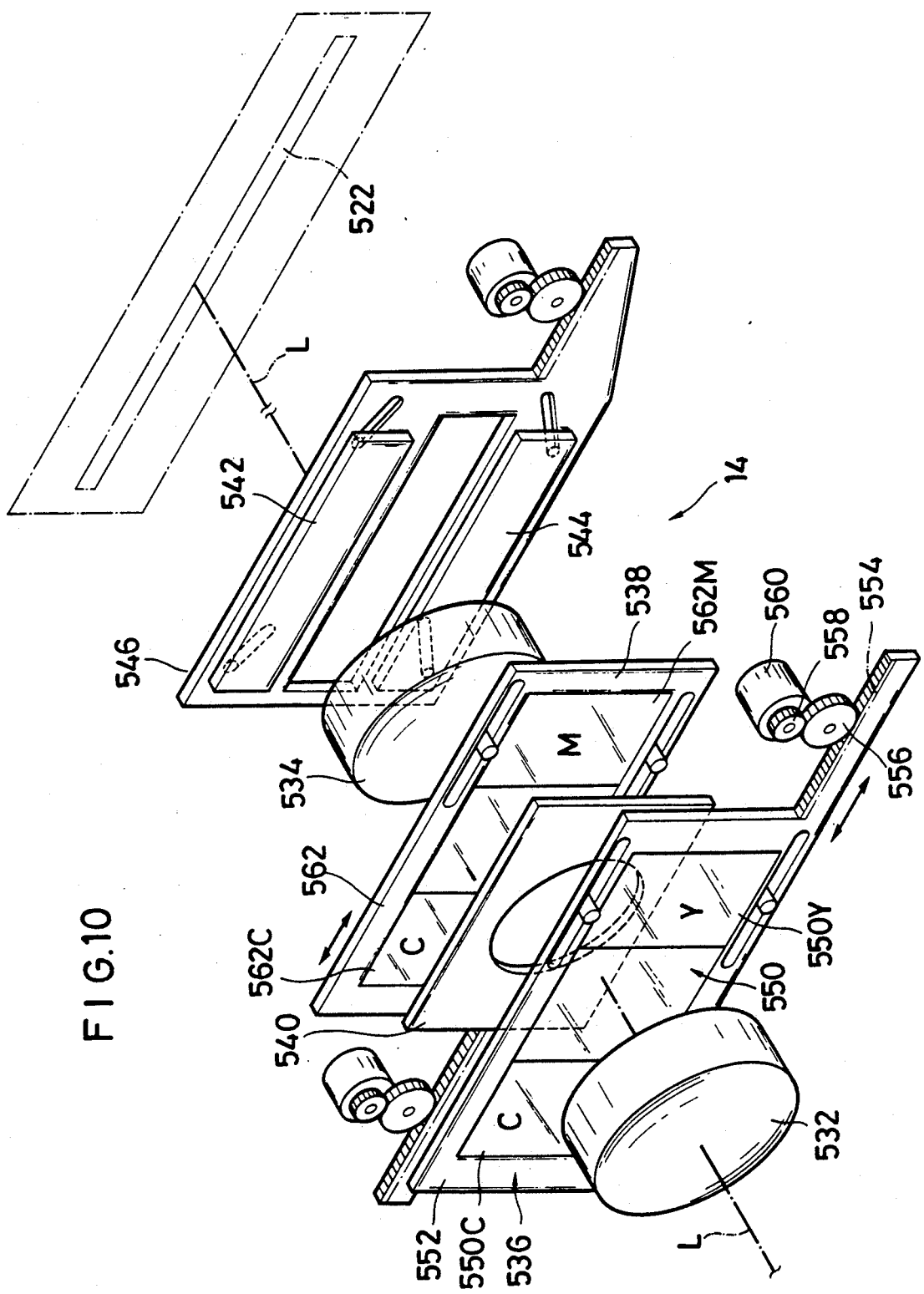
FIG. 10 is a diagrammatic perspective view of an example of the lens unit applied to the prior art slit scanning exposure apparatus.

The lens unit 24 to be used in the first embodiment of the present invention is not limited in any particular way and it may be the lens unit to be described hereinafter and which is shown in FIG. 5, as well as a known lens unit, say, the lens unit shown in FIG. 10.

The lens unit 24 is constructed in such a way that it is capable of moving not only along the optical path L but also in a plane including the rays of reflected light in a direction perpendicular to the optical path L as required. The scanning exposure apparatus 10 performs enlargement exposure with the lens unit 24 being moved forward, and performs reduction exposure with the lens unit moved backward.

The shutter 26 changes the direction of optical path L in such a way that light is admitted either into the image sensor 28 or onto the exposing zone 40. This shutter is pivotally supported on a shaft 62 in such a way that it moves either to the position indicated by a solid line in FIG. 1 or to the position indicated by a dashed line. During ordinary exposure, the shutter 26 is retracted from the optical path L to the position indicated by a solid line; during prescanning or adjustment for white balance, the shutter is inserted into the optical path L to the position indicated by a dashed line so that it further reflects the reflected light to be launched into the image sensor 28 via mirror 64.

The image sensor 28 is intended to perform photometry on such parameters as the quantity and quality of light during prescanning or adjustment for white balance. On the basis of the result of such photometric measurements, not only the type of color filters in the lens unit 24 that are to be inserted into the optical path L and the amounts by which they are inserted but also the amount by which the quantity of light is to be adjusted with the variable diaphragm stop are determined and the necessary adjustments are effected.

The scanning exposure apparatus 10 according to the first embodiment of the present invention has the variable slit assembly 32 positioned in front of the partition wall 30 that separates the apparatus from a zone (not shown) from which the light-sensitive material is to be supplied. The variable slit assembly 32 has a pair of slit plates 34 and 36 which are capable of moving independently of each other in the direction indicated by arrow z, in which the light-sensitive material is to be scanned.

The operation of the variable slit assembly 32 is shown schematically in FIGS. 2a to 2f. The variable slit assembly 32 in the scanning exposure apparatus 10 according to the first embodiment of the present invention comprises a pair of slit plates 34 and 36, drive means which causes these slit plates to move independently of each other in the scanning direction (vertical direction as viewed in FIG. 2), and control means for controlling the movement of each slit plate.

In the example shown in FIG. 2, each of the slit plates 34 and 36 has a rack formed on one end face in a direction perpendicular to the scanning direction (directed into the paper). The rack formed on the slit plate 34 engages a motor 72 via a gear 70 to form drive means, and the rack formed on the slit plate 36 engages a motor 76 via a gear 74 to form drive means. When the motor 72 rotates, the slit plate 34 moves in the scanning direction independently of the slit plate 36 which is capable of moving in response to the rotation of the motor 76.

Each of the motors 72 and 76 is connected to a control circuit 78 which controls the rotation of the respective motors.

In the scanning exposure apparatus 10 according to the first embodiment of the present invention, the use of the variable slit assembly described above insures that during ordinary exposure, the width of the variable slit assembly can be set to a value suitable for the scan width of reflected light irrespective of whatever exposing ratio is selected, and this enables exposure to be performed in a satisfactory way with minimum admission of flare onto the exposure position 40a.

Further, by controlling the movement of individual slit plates 34 and 36, a special operation, such as exposing only a selected area of the light-sensitive material with reflected light from a selected part of the image on the document or exposing only a selected area of the light-sensitive material with reflected light from the image on a small document, can be performed. These techniques can be utilized to perform multiple exposure and edit a single image from the combination of two or more documents.

The operation of the variable slit assembly in the case of exposing only a selected area of the light-sensitive material is described below with reference to FIGS. 2a to 2f and FIGS. 3a and 3b. The following description assumes the case where the scanning exposure apparatus 10 shown in FIG. 1 is of a type that permits the document to be placed in registry with the center line and where the document shown by 14a in FIG. 3a is placed on the platen 12 as shown in FIG. 3a, with the area 14b (see FIG. 3b) being exposed at the ratio 1:1 with reflected light from the image on the document 14a.

Figure 3A:
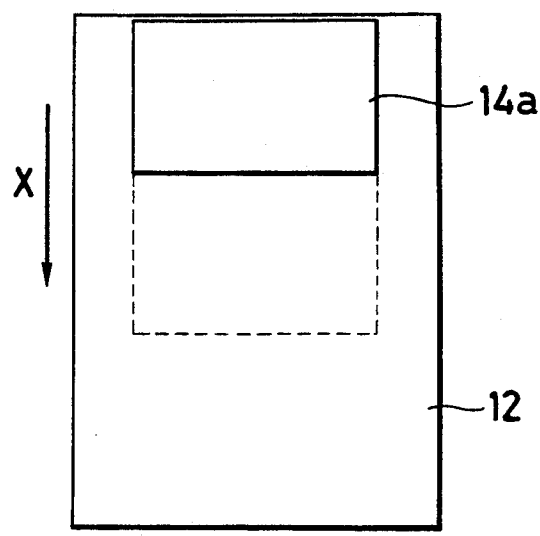
FIG. 3a and 3b are schematic views illustrating the method of performing partial exposure with the slit scanning exposure apparatus of the present invention.
Figure 3B:
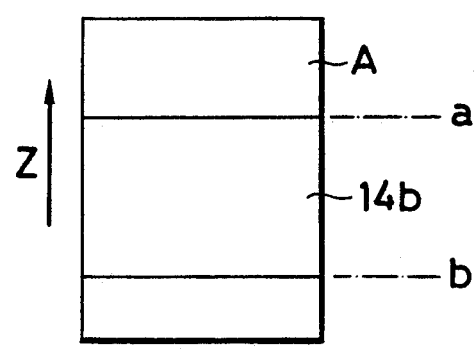

The document 14a is placed on the platen 12 as shown in FIG. 3a and then the area of the light-sensitive material A to be exposed is set to the region delineated by straight lines a and b in FIG. 3b by means of a digitizer or some other region designating means that is connected to the control circuit 78.

When a start button is pressed, the light-sensitive material A is transported in the direction indicated by arrow z. In this case, the slit plates 34 and 36 are held in close contact with each other at their meeting surfaces as shown in FIG. 2a, so the variable slit assembly 32 works as a shutter to block the admission of light onto the exposure position 40a.

When the exposure start position a in the designated area of the light-sensitive material A is transported to the position where the two slit plates are held in close contact with each other, motors 72 and 76 start to rotate clockwise as viewed in FIG. 2. Then, as shown in FIG. 2b, the slit plates which remain in close contact with each other at their meeting surfaces to block the admission of light onto the exposure position 40a, move backward in the scanning direction (hereinafter referred to as "downward") with their meeting surfaces being kept in registry with the exposure start position a.

Figure 2C:
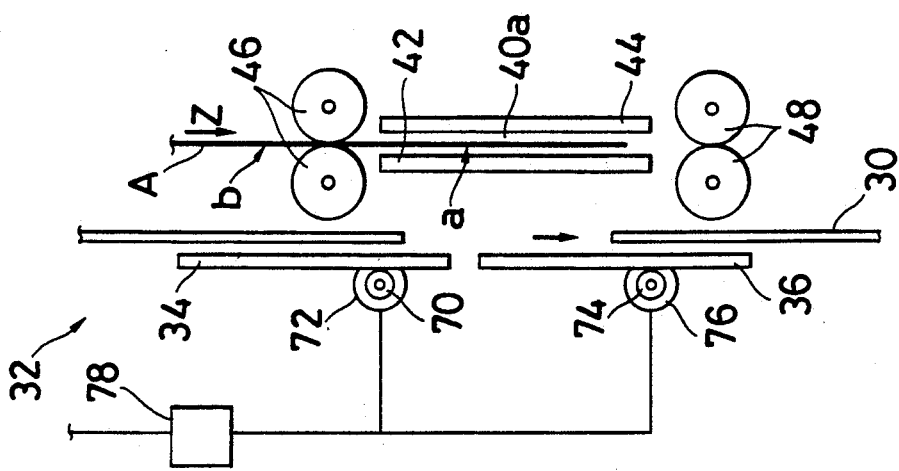
FIG. 2a to 2f are partial diagrammatic sectional views showing the operation of a variable slit assembly incorporated in the slit scanning exposure apparatus of the present invention.
Figure 2B:
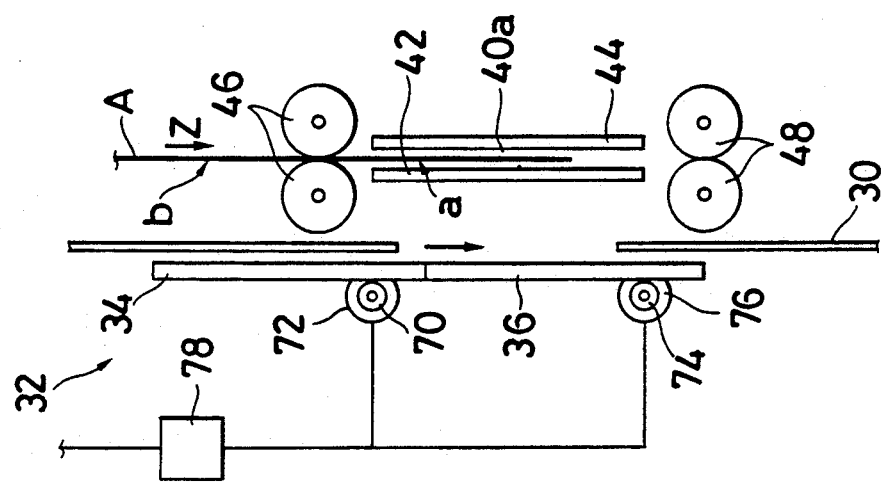
Figure 2A:
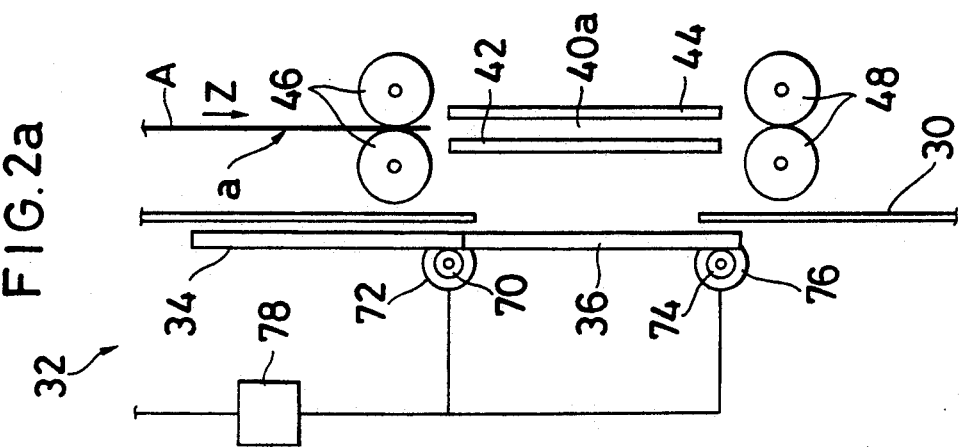

When the exposure start position a (the surface where the two slit plates meet each other) is transported to the upper edge of the spot of reflected light from the document, motor 72 stops rotating, causing the slit plate 34 to be stopped at the position where its lower end face is in registry with the upper edge of the spot of reflected light as shown in FIG. 2c. On the other hand, motor 76 continues to rotate and the slit plate 36, with its upper end face being in registry with the exposure start position a, descends in synchronism with the transport of the light-sensitive material A until the variable slit assembly 32 is opened to permit the light-sensitive material A to be exposed at the exposure start position a with the reflected light from the document.

Figure 2F:
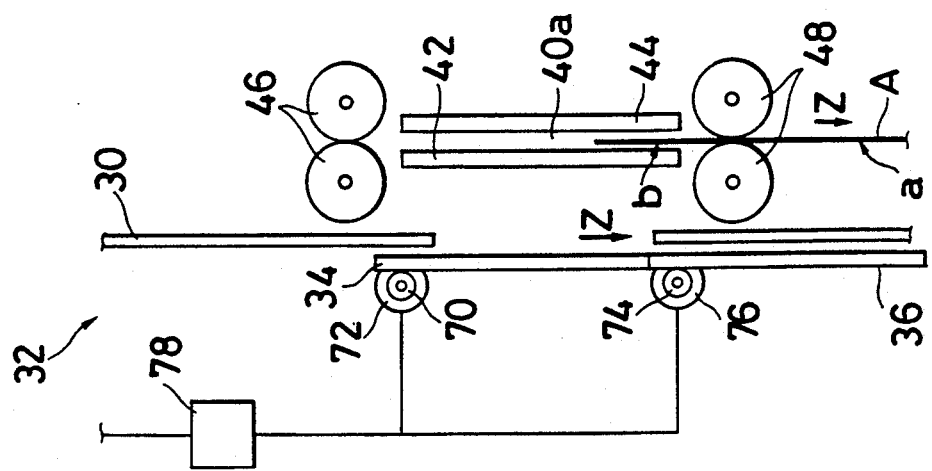

When the upper end face of the slit plate 36 moves to the lower edge of the spot of reflected light, motor 76 stops rotating and the slit plate 36 also ceases to descend. Then, as shown in FIG. 2d, the variable slit assembly 32 is opened to an extent that matches the scan width, or the width of reflected light in the scanning direction, and the light-sensitive material A can be exposed in a satisfactory manner without admission of flare onto the exposure position 40a.

Figure 2E:
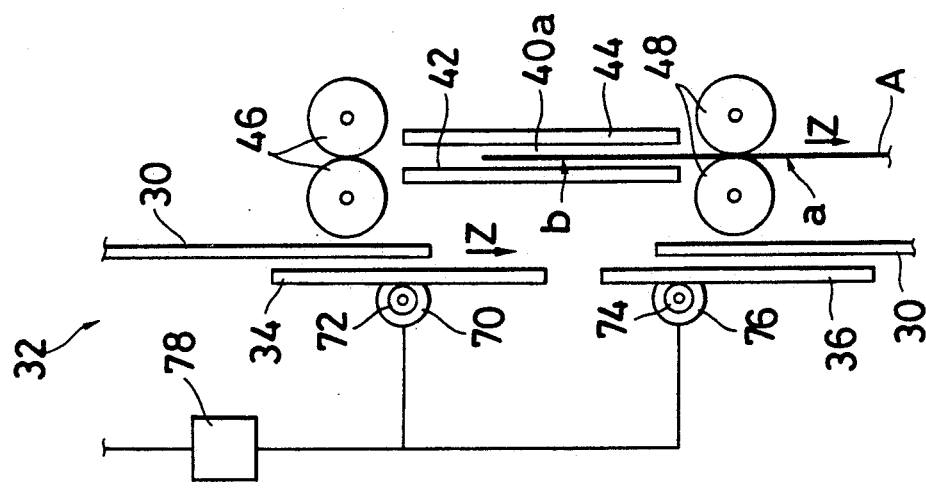
Figure 2D:
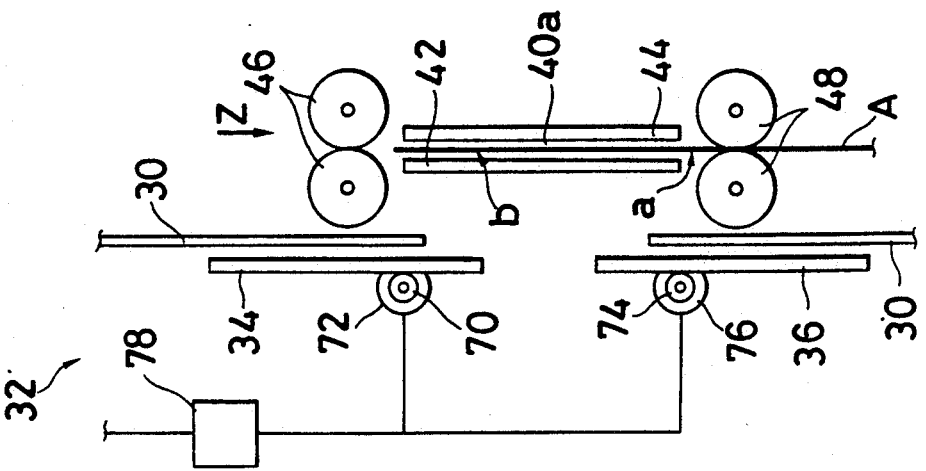

When the exposure proceeds and the light-sensitive material A is transported until the exposure end position b in the designated region of said material comes into registry with the upper edge of the spot of reflected light, motor 72 resumes its rotation in a clockwise direction and as shown in FIG. 2e, the slit plate 34, with its lower edge portion being in registry with the exposure end position a, descends in synchronism with the transport of the light-sensitive material A, thereby starting to close the variable slit assembly 32.

When the light-sensitive material A is transported until the exposure end position b comes into registry with the lower edge of the spot of reflected light, the lower end face of the synchronously descending slit plate 34 will come into close contact with the upper end face of the slit plate 36 at their meeting surfaces to close the variable slit assembly 32 so that it works as a shutter to block the admission of light onto the exposure position 40a. At the same time, motor 76 starts to rotate clockwise and, as shown in FIG. 2f, the slit plates, with their meeting surfaces remaining in close contact with each other to block the admission of light onto the exposure position 40a, move downward to the position where the slit plate 34 blocks completely the admission of light onto the exposure position 40a.

When the exposure of light-sensitive material A is completed, motors 72 and 76 start to rotate counterclockwise as viewed in FIG. 2 and the slit plates 34 and 36, with their meeting surfaces being kept in close contact with each other, move upward to the position where the slit plate 36 blocks the admission of light onto the exposure position 40a (see FIG. 2a). This completes the procedure of preparation for the next cycle of exposure.

Having the variable slit assembly 32 described above, the scanning exposure apparatus according to the first embodiment of the present invention is capable of exposing only a selected area of the light-sensitive material A with reflected light from the document 14a. Since the areas of the light-sensitive material A other than region 14b (see FIG. 3b) remain unexposed similar procedures can be followed to expose other areas of the light-sensitive material with reflected light from other images and by performing this multiple exposure, a plurality of images can be edited to form a single image.

If desired, similar procedures may be repeated to perform several exposures with reflected light from the same image, thereby forming the same image in many areas on a single light-sensitive material A.

In the example shown in FIG. 2, slits plates 34 and 36 are driven separately by motors 72 and 76 but the present invention is not limited to this particular case alone and a single drive source comprising a clutch, gears, etc. may be used to render the two slit plates movable independently of each other. The method of moving the slit plates also is not limited to the racks formed on the respective slit plates and various other mechanisms may be employed as exemplified by the use of various types of cams or the use of a drive shaft, a link, a belt and a wire.

In the scanning exposure apparatus according to the first embodiment of the present invention, the movement of the two slit plates can be controlled by various methods such as a sensor that is provided halfway of the transport path of light-sensitive material A and which detects its position to move a specific slit plate. In another method, the method of moving each slit plate is predetermined in accordance with exposing ratio, the size of image to be formed, or other information and these parameters are entered by the operator or measured with the image sensor 28 to perform automatic control over the movement of the slit plates.

The foregoing description assumes that the light-sensitive material A is exposed across its entire region in the direction of its width (hereinafter referred to as the "widthwise direction") which is perpendicular to the scanning direction indicated by arrow x. If desired, only a part of the surface of the light-sensitive material A in the widthwise direction may be exposed by moving the lens unit 24 in a plane including the rays of reflected light and in a direction perpendicular to the optical path L, or by masking the unwanted areas.

The slit scanning exposure apparatus according to the first embodiment of the present invention has a variable slit assembly in front of, preferably in close proximity to, the exposure position of a light-sensitive material, which assembly consists of a pair of slit plates that are capable of moving independently of each other. Hence, the slit width of the variable slit assembly in front of the exposure position can be adjusted to an optimum value that matches the width of the spot of reflected light from the document in the direction in which it is scanning the light-sensitive material at a selected exposing ratio. As a result, flare such as randomly reflected light from the imaging lens unit will not be admitted onto the exposure position and the formation of a satisfactory image is insured.

Further, the slit plates of the variable slit assembly can be controlled to move independently of each other and this permits the performance of a special operation such as exposing only a selected area of a light-sensitive material with reflected light from part of the image on a document, or exposing only a selected area of the light-sensitive material with reflected light from the image on a small document. If the exposure position on the light-sensitive material is designated by some suitable means, the slit plates can be moved in association with the designated exposure position to either open or close the slit assembly. Thus, by using a digitizer or some other area designating means, the light-sensitive material can be exposed with light reflected from a selected part of the image on a document or only a selected area of the light-sensitive material can be exposed with reflected light from the image on a small document.

By utilizing these techniques to perform multiple exposure, desired parts of more than one document can be edited to form a single image on one light-sensitive material.

The second embodiment of the present invention is described below with reference to FIGS. 4-7.

The slit scanning exposure apparatus according to the second embodiment of the present invention has at least one color filter that can be inserted into the optical path of exposing light, which is adjusted by controlling the amount in which said color filter is inserted into said optical path. The color filter is inserted in a direction parallel to the shorter side of the exposure slit, namely in the direction of exposure by scanning. Thus, unlike the prior art slit scanning exposure apparatus in which color filters are inserted into the optical path in a direction parallel to the slit length (i.e., in a direction perpendicular to the direction of exposure by scanning), the apparatus of the present invention permits the entire surface of a light-sensitive material to be exposed with light that has been properly adjusted by means of color filters. Consequently, a satisfactory image that is uniform is color shades and which has no uneven colors can be formed by using the slit scanning exposure apparatus according to the second embodiment of the present invention. As in the first embodiment, the slit scanning exposure apparatus of the present invention may be of a type in which the light source is movable or of a type in which the document platen is movable.

The slit scanning exposure apparatus according to the second embodiment of the present invention is described below with reference to the preferred examples shown in FIGS. 4-7.

Figure 4:
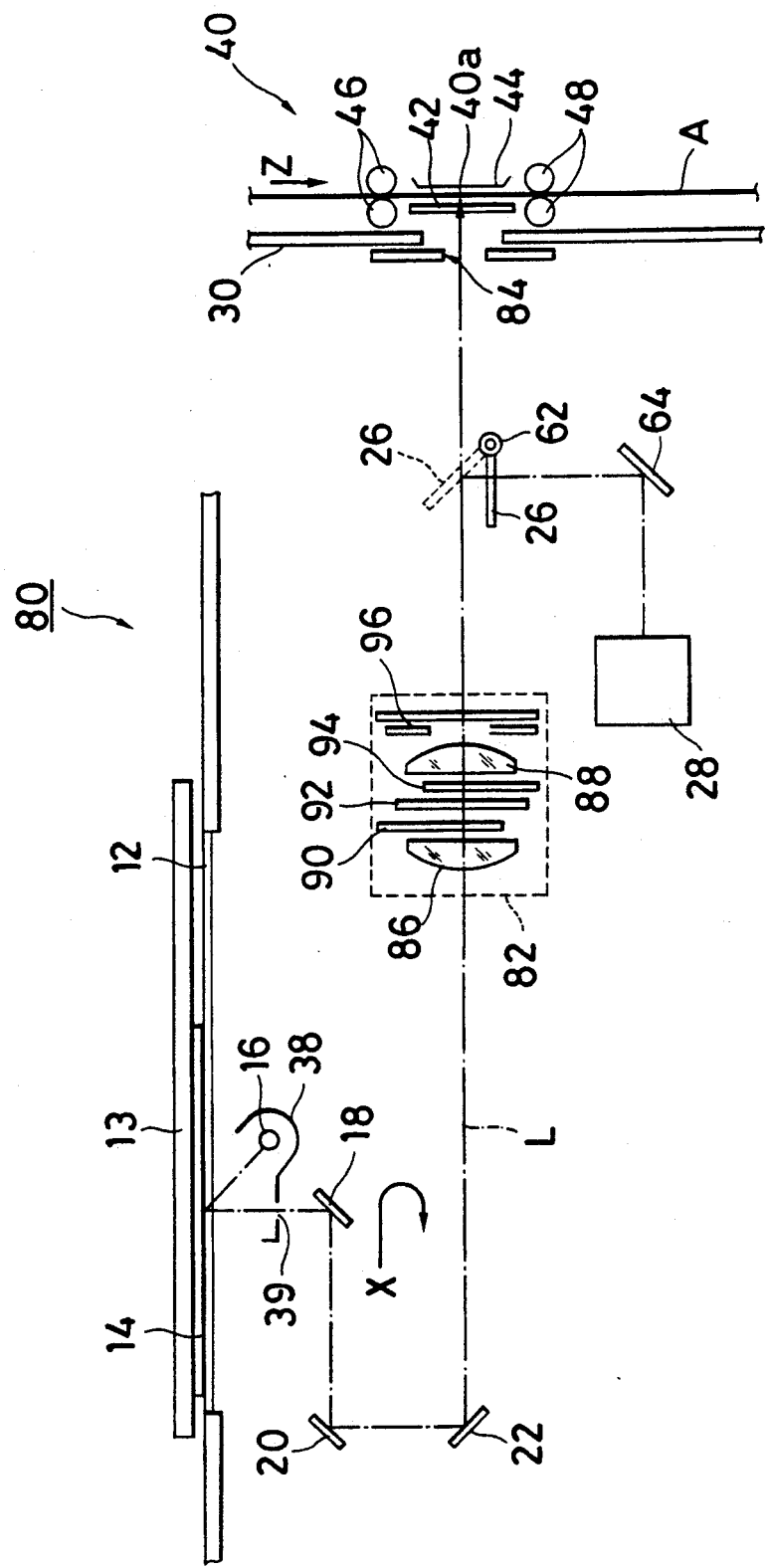
FIG. 4 is a diagrammatic sectional view of a slit scanning exposure apparatus according to another embodiment of the present invention.

FIG. 4 is a diagrammatic sectional view of a preferred example of the slit scanning exposure apparatus (hereinafter referred to as the "scanning exposure apparatus") according to the second embodiment of the present invention. The slit scanning exposure apparatus indicated by 80 in FIG. 4 has essentially the same construction as the slit scanning exposure apparatus 10 shown in FIG. 1 except for the lens unit and the slit located in proximity with the exposing zone, so the constituent elements which are common to both drawings are identified by like numerals and will not be described in detail.

As shown in FIG. 4, the apparatus according to the second embodiment of the present invention is characterized by the construction of color filter assemblies in the lens unit 82. The slit 84 located in proximity with the exposing zone 40 may be a fixed slit or it may be variable as already described in connection with the first embodiment of the present invention (the use of such a variable slit in the slit scanning exposure apparatus according to the second embodiment is a third embodiment of the present invention). If the slit 84 is of a fixed type, it may be formed as an aperture in the partition wall 30.

Like the lens unit 24 (see FIG. 1), the lens unit 82 used in the second embodiment of the present invention is the combination of imaging lenses and a device for adjusting the quantity and quality of reflected light and has the construction shown in FIG. 5. The lens unit 82 comprises the front group 80 and rear group 88 of imaging lenses, a first color filter assembly 90, a fixed diaphragm stop 92, a second color filter assembly 94 (these three components are arranged in the order written along the optical path L of travelling light between the front lens group 86 and the rear lens group 88), and variable diaphragm stop 96 that is located behind the rear lens group 88 and which has a pair of plates 96a and 96b.

The first color filter assembly 90 is such that a colorless and transparent glass plate 100 having a cyan filter 100C and a yellow filter 100Y formed thereon by evaporation or some other suitable method is secured in a frame 91. Similarly, the second color filter assembly 94 is such that a colorless and transparent glass plate 102 having a cyan filter 102C and a magenta filter 102M formed thereon is secured in a frame 95.

The first color filter assembly 90 and the second color filter assembly 94 are moved in the scanning direction, or in a direction parallel to the shorter side of exposure slit 84, so as to insert either one of the associated filters into the optical path L. The first color filter assembly 90 moves downward (as viewed in FIG. 5) in a direction parallel to the shorter side of the slit 84 (this way of movement is hereinafter referred to simply as "downward"), whereas the second color filter assembly 94 moves upward in a direction parallel to the shorter side of exposure slit 84 (this way of movement is hereinafter referred to simply as "upward") so that a specific color filter in either filter assembly will be inserted into the optical path L. The color filter assemblies 90 and 94 will be elaborated later in this specification.

The fixed diaphragm stop 92 adjusts the quality of light and has a circular aperture 93 in the example shown in FIG. 5.

The variable diaphragm stop 96 located behind the rear lens group 88 is composed of a pair of plates 96a and 96b and a plate cam 98.

In the example shown in FIG. 5, two pins 104 provided on the rearward face of the plate 96a and another two pins 106 provided on the rearward face of the plate 96b are supported by being inserted into four oblique grooves 108 formed in the plate cam 98. A rack 110 is also formed on the plate cam 98 and engages a stepping motor 116 via gears 112 and 114.

The variable diaphragm stop 96 is so constructed that when the stepping motor 116 rotates clockwise, the plate cam 98 moves rightward (as viewed in FIG. 5) in a direction parallel to the length of exposure slit 84, whereupon the plates 96a and 96b depart from each other to increase the slit width. On the other hand, when the stepping motor 16 rotates counterclockwise, the plate cam 98 moves leftward along the slit length, whereupon the plates 96a and 96b come closer to each other to decrease the slit width.

Figure 6A:
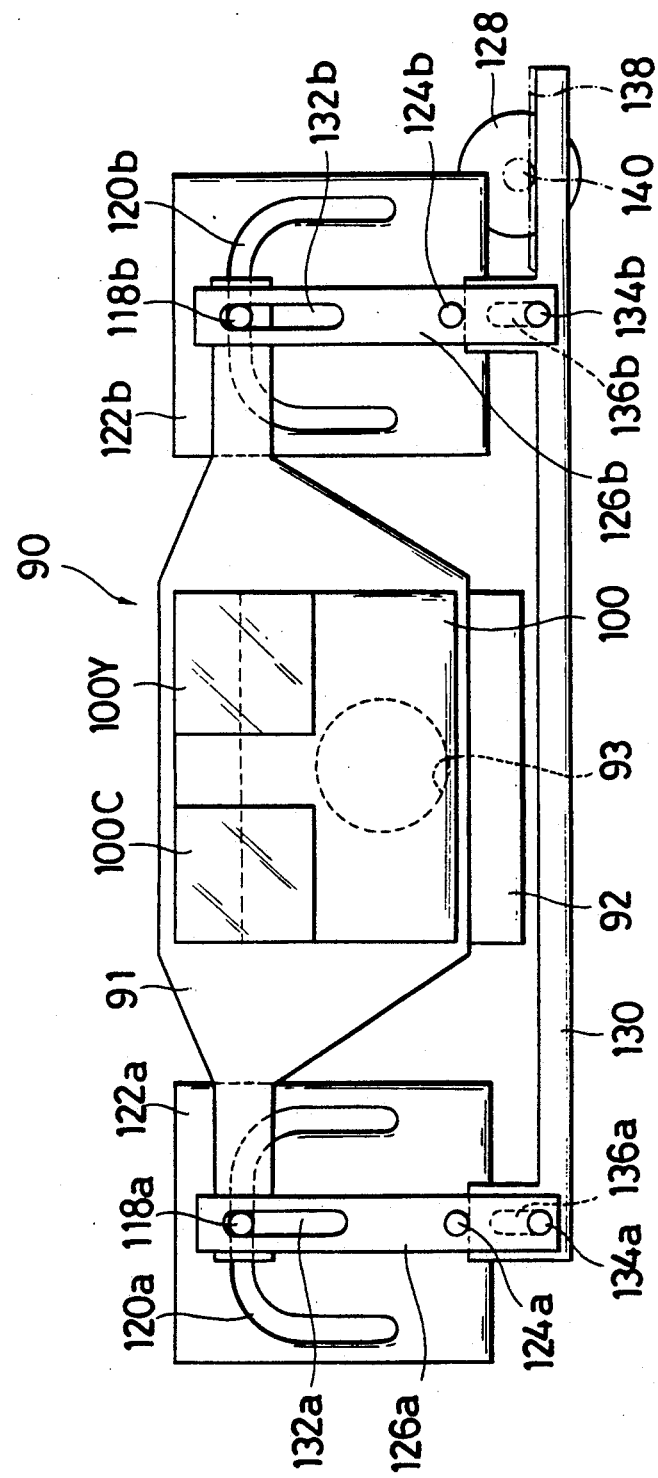

FIG. 6a shows specifically an example of the first color filter assembly 90 and the mechanism for driving it. As already mentioned, the first color filter assembly 90 is such that the glass plate 100 having cyan filter 100C and yellow filter 100Y formed thereon by evaporation or some other suitable method is secured in the frame 91. In the example shown in FIG. 6a, cyan filter 100C is formed in the upper left part of glass plate 100 whereas yellow filter 100Y is formed in the upper right part of said glass plate (the horizontal direction as viewed in FIG. 6a corresponds to the longitudinal direction of slit 84 shown in FIG. 5), and the two filters are separated by a distance equal to the "play" of the drive mechanism to be described later in this specification.

In the example shown in FIG. 6a, the aperture 93 in the fixed diaphragm stop 92 is circular, so if each of the cyan filter 100C and yellow filter 100Y is a square of such a size that the aperture 93 is inscribed in it, the overall size of the color filter assembly 90 can be reduced. Pins 118a and 118b that are to engage the drive mechanism are provided in the left and right end portions, respectively, of the frame 91.

The drive mechanism for the first color filter assembly 90 comprises basically the following components: a support member 122a having a guide groove 120a of a generally inverted U shape formed therein; a support member 122b having a similarly shaped guide groove 120b formed therein; a transmission member 126a pivotally supported on a fulcrum 124a formed on the support member 122a; a transmission member 126b pivotally supported on a fulcrum 124b formed on the support member 122b; and a drive member 130 that engages both transmission members to drive them by rotation of a motor 128.

The support members 122a and 122b are secured by fastening means (not shown). Pin 118a is inserted into the guide groove 120a formed in the support member 122a, and pin 118b is inserted into the guide groove 120b formed in the support member 122b. This arrangement allows the frame 91 to be supported in such a way that it is capable of vertical movements along guide grooves 120a and 120b.

As already mentioned, the guide groove 120a formed in the support member 122a is an aperture having a generally inverted U shape, and it has a linear top portion that takes into account the play of the overall drive mechanism. The guide groove 120a is symmetric with respect to the center line and its left half is of such a shape that the linear portion is followed by a quadrant of a circle having the same radius as the aperture 93, which in turn is followed by a downwardly extending straight line. Stated more specifically, the shape of the guide grove 120a is such that when the pin 118a moving to the left comes out of engagement with the linear portion of the guide groove 120a, the lower left corner of yellow filter 100Y descends along the circumference of the aperture 93 after passing by its highest point, and that when said lower left corner descends to the leftmost part of aperture 93, it subsequently drops in a vertical direction.

The right half of the guide groove 120a has such a shape that when the pin 118a moves to the right, the lower right corner of cyan filter 100C will move in a similar way. Hence, the distance between cyan filter 100C and yellow filter 100Y is equal to the length of the linear top portion of guide groove 120a.

The play of the drive mechanism need not be provided in the guide groove 120a in the present invention and if no play is provided, the distance between cyan filter 100C and yellow filter 100Y will inevitably become zero. The guide groove 120b formed in the support member 122b has a similar shape to the guide groove 120a.

In the example shown in FIG. 6a, lower fulcrums 124a and 124b are formed on the support members 122a and 122b, respectively, in the center of their lower portion. Transmission member 126a is pivotally supported on the fulcrum 124a. A slit (elongated hole) 132a is formed in the upper part of transmission member 126a and the already described pin 118a is inserted into this slit 132a. A pin 134a which is to engage the drive member 130 is secured to the lower end portion of transmission member 126a.

Slit 132a is formed parallel to the longitudinal direction of transmission member 126a and has such a shape that pin 118a loosely fitted thereinto can move freely. This slit need only have a length that permits free movement of the frame 91 in vertical directions.

The transmission member 126b also has a similarly shaped slit 132b of the same size, as well as a pin 134b and is pivotally supported on the fulcrum 124b formed on the other support member 122b. Pin 118b is inserted into slit 132b.

In the example shown in FIG. 6a, slits 136a and 136b in the drive member 130 through which pins 134a and 134b are to be inserted are formed in a vertical direction with respect to pins 118a and 118b on the frame 91 in such a way that the distance between slit 136a and pin 118a is equal to the distance between slit 136b and pin 118b. The drive member 130 is brought into engagement with transmission members 126a and 126b by means of pins 118a and 118b. A rack 138 is formed on the drive member 130 and brought into engagement with a motor 128 via a gear 140. Depending on the direction in which the motor 128 rotates, the drive member 130 moves either leftward or rightward to tilt both transmission members 126a and 126b, causing pins 218a and 218b to move along guide grooves 120a and 120b, respectively, so that either one of color filters descend along the circumference of the aperture 93 in the fixed diaphragm stop 92 until it is inserted into the optical path L.

A pulse motor, a stepping motor or any other suitable motor may advantageously be used as the motor 128.

Figure 6B:
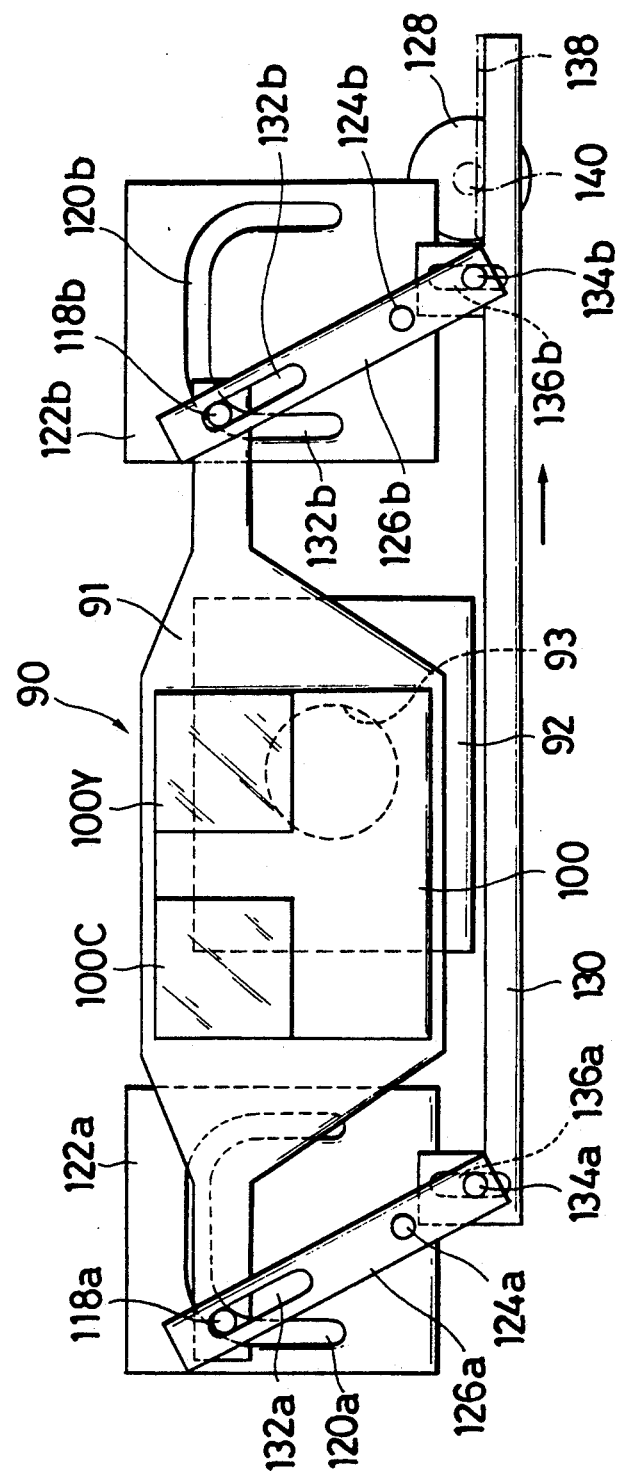

The operation of the first color filter assembly 90 and that of the mechanism for driving it are described below. First, the case of inserting yellow filter 100Y into the optical path L is explained. As shown in FIG. 6b, motor 128 rotates counterclockwise and drive member 130 moves to the right by an amount that is proportional to the amount of motor rotation. When the drive member 130 moves to the right, transmission members 126a and 126b in engagement with the drive member via pins 134a and 134b pivot counterclockwise about the fulcrums 124a and 124b, respectively, by an amount proportional to that of the movement of the drive member.

As a result of pivoting of transmission members 126a and 126b, the drive force is transmitted to pins 118a and 118b inserted into slits 132a and 132b, respectively, causing the frame 91 to move to the left.

Since pins 118a and 118b are also in engagement with the guide grooves 120a and 120b in the support members 122a and 122b, respectively, these pins will move along the guide grooves 120a and 120b. the guide grooves 120a and 120b have the shape already described above. Thus, as long as pins 118a and 118b move in the linear portions of guide grooves 120a and 120b, the frame 91 continues to make a translational movement to the left, and when they come out of engagement with those linear portions, the lower left corner of yellow filter 100Y moves down along the periphery of the aperture 93 and yellow filter 100Y is inserted into the optical path L by closing the upper portion (in a direction parallel to the shorter side of the exposure slit) by an amount proportional to that of the rotation of motor 128.

As already mentioned, the frame 91 moves (or yellow filter 100Y is inserted) downward in a vertical direction after pins 118a and 118b come out of engagement with the curved portions of guide grooves 120a and 120b.

If the operator wants to insert cyan filter 100C into the optical path L, the following procedure is taken. Motor 128 is rotated clockwise and drive member 130 moves to the left to cause transmission members 126a and 126b to pivot clockwise. As shown in FIG. 6c, pins 118a and 118b then move along guide grooves 120a and 120b, respectively, until cyan filter 100C is inserted into the optical path L by closing the aperture 93.

Figure 7:
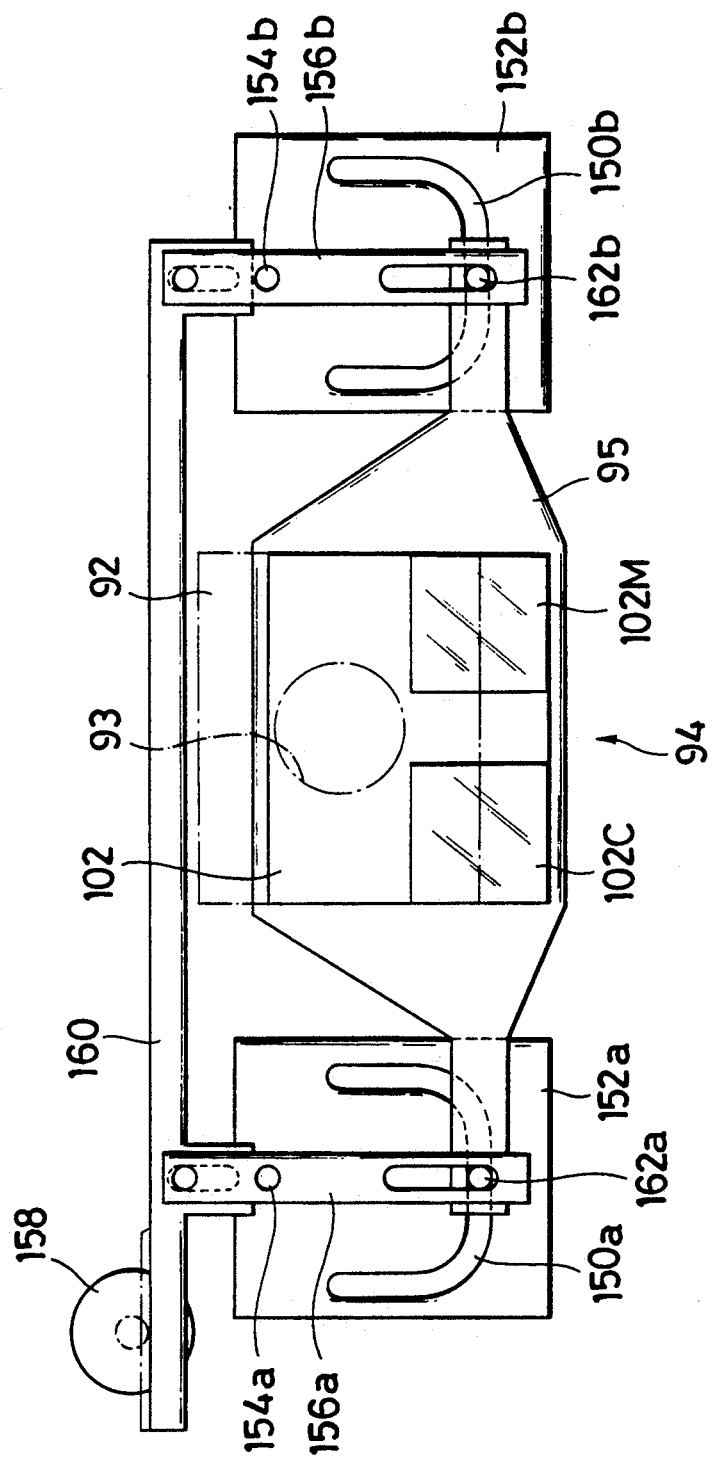
FIG. 7 is a diagrammatic front view of the second color filter assembly to be used in the lens unit shown in FIG. 5.

FIG. 7 shows specifically an example of the second color filter assembly 94 and the mechanism for driving it. Like the first color filter assembly 90, the second color filter assembly 94 is such that colorless and transparent glass plate 102 having cyan filter 102C and magenta filter 102M formed thereon by evaporation or some other suitable method is secured in a frame 95. In the example shown in FIG. 7, cyan filter 102C is formed in the lower left part of glass plate 102 whereas magenta filter 102M is formed in the lower right part of said glass plate.

The mechanism for driving the second color filter assembly 94 is similar in construction to the mechanism for driving the first color filter assembly 90 and comprises basically the following components: a support member 152a having a guide groove 150a; a support member 152b having a guide groove 150b; a transmission member 156a pivotally supported on a fulcrum 154a formed on the support member 152a; a transmission member 156b pivotally supported on a fulcrum 154b formed on the support member 152b; and a drive member 160 that engages both transmission members to drive them by rotation of a motor 158.

The second color filter assembly 94 shown in FIG. 7 and the mechanism for driving it need not be described in great detail since they are essentially the same as the already described first color filter assembly 90 and its associated drive mechanism except that the position of a motor 158 in engagement with the drive member 160 differs from the motor 128 and that the combination of color filter assembly and its drive mechanism is inverted. It should however be noted that the first color filter assembly 90 is operated by inserting either one of the associated color filters from above into the optical path L, whereas with the second color filter assembly 94, either one of the associated color filters is inserted from below into the optical path L, as specifically described below. When motor 158 rotates clockwise, the drive member 160 moves to the left and each of the transmission members pivots clockwise, whereupon pins 162a and 162b ascend rightward along their guide grooves 150a and 150b until cyan filter 102C partly closes the aperture 93. Conversely, when motor 158 rotates counterclockwise, the drive member 160 moves to the right and each of the transmission members pivots counterclockwise, whereupon pins 162a and 162b ascend leftward along their guide grooves 150a and 150b until magenta filter 102M partly closes the aperture 93.

In the slit scanning exposure apparatus according to the second embodiment of the present invention, either one of the color filters in each of the first and second color filter assemblies is inserted into the optical path L in the scanning direction, namely, in a direction parallel to the shorter side of the exposure slit. Thus, compared to the prior art version in which color filters are inserted into the optical path in a direction parallel to the slit length, the slit scanning exposure apparatus of the present invention is capable of forming an image of better quality that is free from unevenness in colors.

In the second embodiment of the present invention, each of the color filter assemblies is driven by the link mechanism described above but this is not the sole example of the drive mechanism for the color filter assemblies and it may be replaced by various other means for causing movements in x- and y-directions, such as a rack-and-pinion, a drive screw/travelling nut, and the combination thereof. Motor and other drive sources that are to be used need not be one in number and needless to say, more than drive source may be employed.

As described above, the slit scanning exposure apparatus according to the second embodiment of the present invention is so constructed that color filters for adjusting the quality of reflected light from a document are inserted into the optical path in a direction parallel to the shorter side of the exposure slit. Hence, the entire surface of the light-sensitive material A can be exposed with light that has been appropriately adjusted by color filters and this contributes to the formation of a satisfactory image across the light-sensitive material A with uniform color shades and in the absence of any uneven colors.

The slit scanning exposure apparatus according to the second aspect of the present invention has at least one color filter that can be inserted into the optical path of exposing light, which is adjusted by controlling the amount in which said color filter is inserted into said optical path. The color filter is inserted in a direction parallel to the shorter side of the exposure slit, namely in the direction of scanning for exposure. Thus, unlike the prior art slit scanning exposure apparatus in which color filters are inserted into the optical path in a direction parallel to the slit length (i.e., in a direction perpendicular to the direction of scanning for exposure), the apparatus of the present invention permits the entire surface of a light-sensitive material to the exposed with light that has been properly adjusted by means of color filters. Consequently, a satisfactory image that is uniform in color shades and which has no uneven colors can be formed by using the slit scanning exposure apparatus according to the second embodiment of the present invention.

A slit scanning exposure apparatus according to the third embodiment of the present invention is essentially the same as the slit scanning exposure apparatus according to the second embodiment of the present invention except that the slit provided in proximity with the exposure position is formed by a variable slit assembly of the type used in the slit scanning exposure apparatus according to the first embodiment of the present invention. In other words, the slit scanning exposure apparatus according to the third embodiment of the present invention is composed of the combination of the already described first and second embodiments and hence need not be explained in detail.

The slit scanning exposure apparatus according to the third embodiment of the present invention is capable of producing an image of high quality that is free from unevenness in colors, that has uniform color shades, that is sharp in the absence of blurred contour due to flare, and that is characterized by satisfactory color and density reproduction. Further, the apparatus is simple in construction and yet is capable of editing a plurality of document images to form the above-described high-quality image on a single print.

Figure 8:
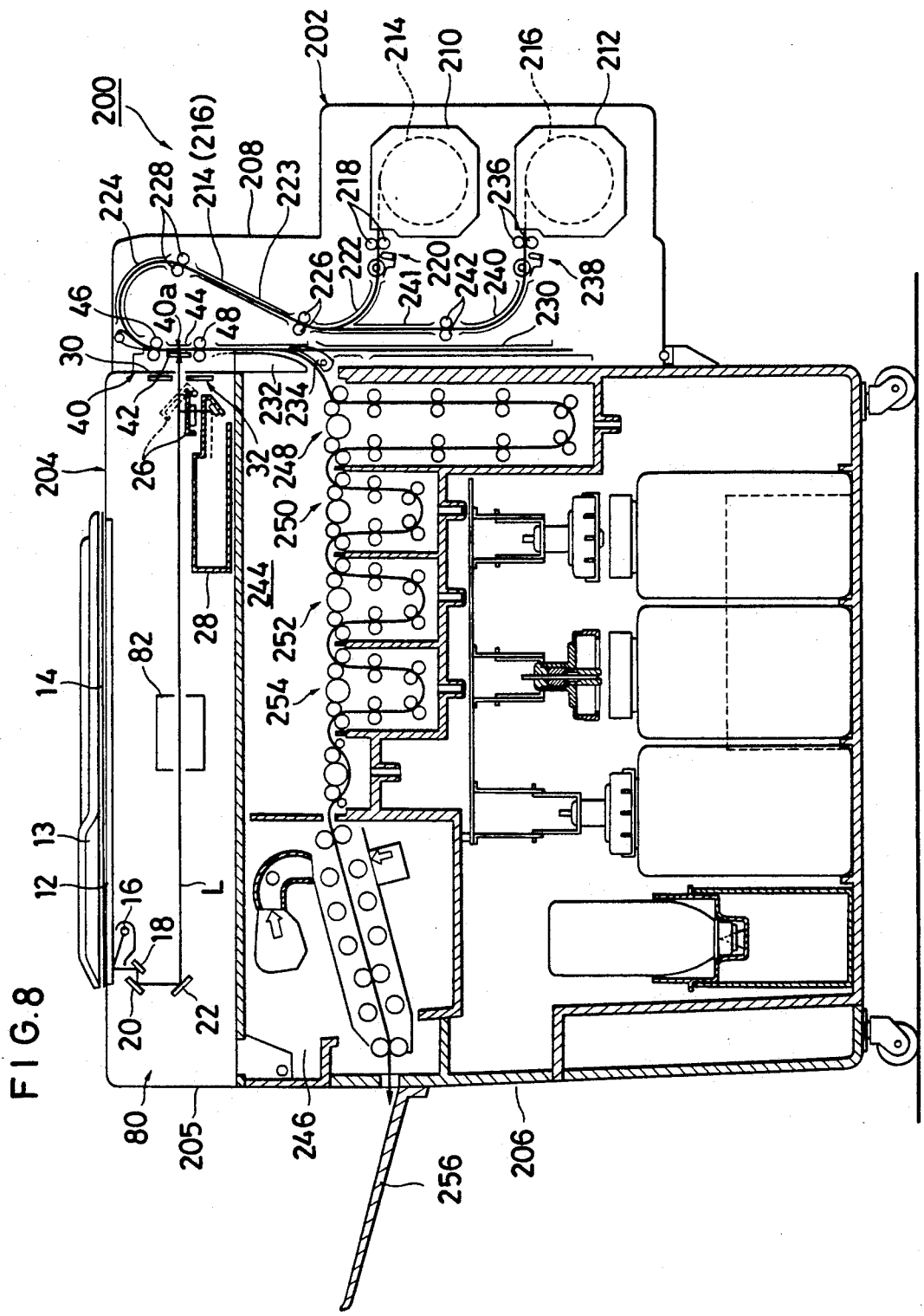
FIG. 8 is a diagrammatic sectional view showing a silver halide photographic copier to which a slit scanning exposure apparatus according to a still another embodiment of the present invention is applied.
Figure 9:
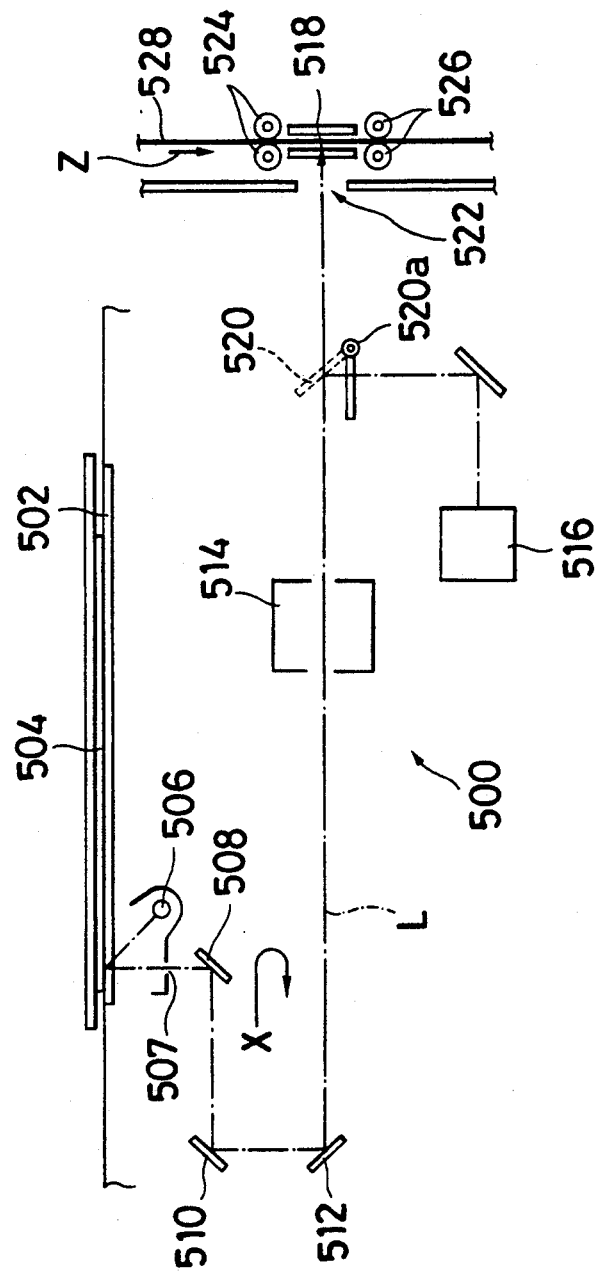
FIG. 9 is a diagrammatic sectional view of a prior art slit scanning exposure apparatus.

FIG. 8 shows a silver halide photographic copier incorporating the slit scanning exposure apparatus according to the third embodiment of the present invention. The silver halide photographic copier (hereinafter referred to simply as "copier") generally indicated by 200 in FIG. 8 consists of three basic units, a light-sensitive material supply unit 202 on the right side, an exposing unit 204 in the upper part, and processing unit 206 in the lower part.

The exposing unit 204 comprises frame 205 having incorporated therein the slit scanning exposure apparatus according to the third embodiment of the present invention. In other words, the slit scanning exposure apparatus incorporated in the frame 205 is essentially the same as the apparatus according to the second embodiment of the present invention which is indicated by 80 in FIG. 4 except that slit assembly 84 is replaced by the variable slit assembly 32 in the apparatus according to the first embodiment of the present invention which is indicated by 10 in FIGS. 1–3. Hence, the components common to the three embodiments are identified by like numerals and will not be described in detail.

The light-sensitive material supply unit 202 comprises a frame 208 having in its interior the transport path of light-sensitive materials and a pair of detachable magazines 210 and 212 stacked one on top of the other. Rolls of light-sensitive materials 214 and 216 are placed in the magazines 210 and 212, respectively, and they are withdrawn from the respective magazines to be transported through the supply unit 202. In one example, light-sensitive material 214 may be optimal for the purpose of copying color printed documents, and 216 may be optimal for copying color photographic document.

Provided ahead of the magazine 210 are transport rollers 218 for withdrawing light-sensitive material 214, which are followed by a cutter 220 for cutting the light-sensitive material 214 to a predetermined length.

Light-sensitive material transport guides 222, 223 and 224 and transport rollers 226 and 228 are provided between the cutter 220 and the exposing zone 40 so as to guide a predetermined length of light-sensitive material 214 to the exposing zone 40. The exposing zone 40 is an area for defining the exposure position 40a in association with the light-sensitive material 214. In this exposing zone 40, a glass plate 42 is fixed facing the slit scanning exposure apparatus 10 in the exposing unit 204 and a pressure plate 44 is pressed against the glass plate 42.

A pair of transport rollers 46 are provided upstream (above) the exposing zone 40 whereas a pair of transport rollers 48 are provided downstream (beneath) said exposing zone. Further below the exposing zone 40 is provided a transport guide 230 which guides the exposed light-sensitive material 214 downwardly in a vertical direction. A change guide 234 for changing the direction of the transport path of light-sensitive material 214 (or 216) in such a way that it is fed into the processing unit 206 via a branching transport guide 232 is provided halfway down the transport guide 230.

Magazine 212 placed below the magazine 210 is furnished with transport rollers 236 and a cutter 238 in association with the light-sensitive material 216 and they are followed by transport guides 240 and 241 and transport rollers 242 so that the light-sensitive material 216 is conveyed to the transport guide 222.

The processing unit 206 consists of a processing zone 244 and a drying zone 246. The processing zone 244 contains in it a sequence of a developing tank 248, a bleach and fix tank 250 and washing tanks 252 and 254. These tanks are filled with processing solutions that perform development, bleaching, fixing and washing on light-sensitive material 214 (or 216), which is then supplied into the drying zone 246. The light-sensitive material 214 (or 216) emerging from the washing tank 254 is dried in the drying zone 246 and hence fed to a receiving tray 256.

The copier 200 incorporating the slit scanning exposure apparatus according to the third embodiment of the present invention is operated as follows in order to copy a document in the ordinary mode (i.e., all the image on the document 14 is copied on the entire surface of light-sensitive material A). First, document 14 is placed on the platen 12 and the top cover 13 is closed. Then, a specific exposing ratio is selected and the start button (not shown) on the copier 200 is pressed, whereupon exposing light source 16 turns on and the light source unit starts a scanning operation (prescanning is started). On this occasion, the slit plates 34 and 36 of the variable slit assembly 32 are held in close contact with each other at their meeting surfaces and hence the slit assembly 32 works as a shutter.

Reflected light from the document 14 is reflected by mirror 18 and further reflected by mirrors 20 and 22 in the mirror unit which move in the same direction as the light source unit at one half the speed of its movement. The so reflected light travels along the optical path L, passes through the lens unit 82 and is reflected by the shutter 26 to be admitted into the image sensor 28, where image information is read to set conditions for exposure modification.

After completion of this prescanning operation, the light source unit and the mirror unit are returned to the position where the scanning was started.

The variable slit assembly is operated by the associated motors to adjust the slit width to an optimum value that matches the scan width of reflected light at the selected exposing ratio. In the lens unit 82, the first color filter assembly 90 and the second color filter assembly 94 are operated in the manner described in connection with the second embodiment and either one of the associated color filters is inserted into the optical path L in a direction parallel to the shorter side of the exposure slit 84 in accordance with the preset conditions for exposure modification. The variable diaphragm stop 96 is also adjusted to provide an aperture that matches the preset conditions for exposure modification.

While prescanning and adjustments of the color filters and the diaphragm stop are being performed, the light-sensitive material which is necessary for copying a document of interest is selected. For example, if the document 14 is a color photographic original, light-sensitive material 216 is selected. When a transport motor (not shown) is driven, transport rollers 236 and 242 deliver the light-sensitive material 216 by a predetermined length and is cut to the necessary length by means of the cutter 238. Upon further driving of the transport motor, the light-sensitive material 216 is supplied to the exposing zone 40 and pauses just in front of the exposure position 40a. When the shutter 26 pivots to the position indicated by a solid line, it becomes possible to perform exposure and the light source unit starts the operation for main scanning of the document 14. At the same time, transport rollers 46 and 48 in the exposing zone 40 start to transport the light-sensitive material 216 for scanning in synchronism with the scan speed of the light source unit. During the main scanning operation, light emitted from the exposing light source 16 in the light source unit and which has been reflected by mirror 18 is further reflected by mirrors 20 and 22 which move in the same direction as the light source unit at one half the speed of its movement. The reflected light is then adjusted by passage through the lens unit 82 that has been properly adjusted in terms of color filters and aperture. The light thus adjusted passes through the slit in the variable slit assembly located in front of the partition wall 30 and is focused at the exposure position 40a to expose the light-sensitive material 216 which is being transported for scanning in synchronism with the light source unit by means of roller pairs 46 and 48.

Since the copier 200 incorporates the slit scanning exposure apparatus 80 according to the second embodiment of the present invention, any one of the color associated filters is inserted into the optical path L in the scanning direction, namely in the direction parallel to the shorter side of the exposure slit and this insures that the entire surface of the light-sensitive material 216 is exposed with the properly adjusted light without causing any unevenness in colors.

Further, the copier 200 uses a slit assembly which is of the same type as the variable slit assembly 32 used in the slit scanning exposure apparatus 10 in accordance with the first embodiment of the present invention and this variable slit assembly is capable of producing an optimum exposure slit that matches the scan width of reflected light from the document. Thus, exposure can be performed in a satisfactory way with minimum admission of flare onto the exposure position 40a.

As the exposure proceeds, the light-sensitive material 216 between the transport rollers 46 and 48 is moved downward through the transport guide 230. In this instance, the change guide 234 does not act on the transport path of the light-sensitive material 216 being supplied from the exposing zone 40 and said material moves downward vertically through the transport guide 230.

When the process of exposure is completed, the shutter 26 pivots to the position indicated by a dashed line in FIG. 8 and blocks the optical path of reflected light. Then, all of the transport rollers change the direction of their rotation and the exposed light-sensitive material 216 ascends the transport guide 230 and part of it is supplied into the transport guide 224.

The transport of the light-sensitive material 216 in the reverse direction continued until its leading edge comes upstream of the change guide 234. Thereafter, all of the transport rollers are caused to rotate in the same forward direction as they did previously to transport the light-sensitive material 216. On this occasion, the change guide 234 acts on the transport path of the light-sensitive material 216 so that its leading edge will be delivered to the branching transport guide 232. As a result, the leading edge of the light-sensitive material 216 passes by the branching transport guide 232 to be forwarded to the processing zone 244 in the processing unit 206.

The exposed light-sensitive material 216 which has been sent into the processing zone 244 is developed in the developing tank 248, bleached and fixed in the bleach and fix tank 250 and washed thoroughly in the washing tanks 252 and 254. The light-sensitive material emerging from the washing tank 254 is fed into the drying zone 246 where it is dried and thence delivered to the receiving tray 248.

The above-described copying procedure produces an image of high quality that is free from unevenness in colors, that has uniform color shades, that is sharp in the absence of blurred contour due to flare, and that is characterized by faithful color and density reproduction.

While the slit scanning exposure apparatus of the present invention has the construction described on the foregoing pages, it should be understood that the present invention is not limited to the three embodiments described above and that various improvements and design modifications are possible without departing from its spirit and scope.

What is claimed is:

1. A slit scanning exposure apparatus, comprising; an exposing light source, a plurality of mirrors by which light emitted from said exposing light source and reflected from an image on a document moving relative to said exposing light source is reflected toward a predetermined exposure position, an imaging lens unit which acts on an optical path of said reflected light and by which the image on said document is focused at said exposure position on a light-sensitive material, said material being transported in synchronism with the speed at which the image on said document is scanned with said exposing light source, a pair of slit plates provided in front of said exposure position and movable independently of each other in the scanning direction, means for driving said pair of slit plates independently of each other, and control means for controlling said drive means so that said pair of slit plates will move independently of each other in accordance with the area of said light-sensitive material to be exposed.

2. A slit scanning exposure apparatus according to claim 1 wherein said drive means comprises a rack formed on each of said slit plates, a gear meshing with said rack, and a motor for driving said gear.

3. A slit scanning exposure apparatus according to claim 1 wherein said slit plates are movable in synchronism with the speed at which said light-sensitive material is transported for scanning.

4. A slit scanning exposure apparatus according to claim 1 wherein said exposing light source and said plurality of mirrors form an imaging optical unit which moves to perform scanning by illuminating said image on a document which is fixed.

5. A method for exposing a selected area of a light sensitive material defined between an exposure start position and an exposure end position with a light reflected from a selected area or all of an image on a document by using a slit scanning exposure apparatus comprising, an exposing light source;

a plurality of mirrors by which a light emitted from said exposing light source and which is reflected from said image on said document moving relative to said exposing light source is reflected toward a predetermined exposure position;

an imaging lens unit that acts on an optical path defined by the reflected light and by which said image on said document is focused in said exposure position on said light-sensitive material which is being transported in synchronism with the speed at which the image on said document is scanned with said exposing light source;

a pair of an upstream and a downstream slit plates which are provided in front of said exposure position and which are movable independently of each other in the scanning direction of the light-sensitive material to define a slit whose width is adjustable in accordance with exposing ratio such that said light-sensitive material is exposed with the reflected light which passed through said slit;

drive means for moving said pair of slit plates independently of each other; and control means for controlling said drive means; comprising the step of, moving said pair of slit plates in the scanning direction of the light-sensitive material while they are held in close contact with each other at their meeting surface such that said meeting surface is in register with the exposure start position of said light-sensitive material until said meeting surface of said slit plates and said exposure start position of said light-sensitive material are in register with upstream edge of said optical path defined by said reflected light whose width is determined by the selected exposure ratio;

stopping said upstream slit plate with its downstream end face in register with said upstream edge of said optical path, while said downstream slit plate continues its movement with its upstream end face in register with said exposure start position of said light-sensitive material to enlarge the slit defined between said upstream and said downstream slit plates until said upstream end face of said downstream slit plate is in register with downstream edge of said optical path defined by said reflected light;

stopping said downstream slit plate with its upstream end face in register with said downstream edge of said optical path such that the slit has a width equal to that of said optical path until said exposure end position is in register with said upstream edge of said optical path; and moving said upstream slit plate in the scanning direction with its downstream end face in register with said exposure end position, while said upstream end face of said downstream slit plate is kept in register with said downstream edge of said optical path, to narrow the slit formed between said upstream and said downstream slit plates until said downstream end face of said upstream slit plate becomes in close contact with the upstream end face of said downstream slit plate to close the slit.

* * * * *